United States Patent
Konstantin et al.

(10) Patent No.: US 9,586,173 B2
(45) Date of Patent: Mar. 7, 2017

(54) ACTIVATIONLESS GAS PURIFIERS WITH HIGH SORPTION CAPACITY

(71) Applicant: MECHEM LAB LTD., Nesher Ot (IL)

(72) Inventors: Chuntonov Konstantin, Migdal Haemek (IL); Setina Janez, Ljubljana (SL)

(73) Assignee: MECHEM LAB LTD., Nesher (IL)

( * ) Notice: Subject to any disclaimer, the term of this patent is extended or adjusted under 35 U.S.C. 154(b) by 0 days.

(21) Appl. No.: 14/595,268

(22) Filed: Jan. 13, 2015

(65) Prior Publication Data
US 2016/0045855 A1 Feb. 18, 2016

Related U.S. Application Data

(60) Provisional application No. 62/070,206, filed on Aug. 18, 2014.

(51) Int. Cl.
| | |
|---|---|
| B01D 53/02 | (2006.01) |
| B01D 53/12 | (2006.01) |
| B01J 20/02 | (2006.01) |
| B01J 20/28 | (2006.01) |

(52) U.S. Cl.
CPC ............ *B01D 53/12* (2013.01); *B01D 53/02* (2013.01); *B01J 20/02* (2013.01); *B01J 20/28016* (2013.01); *B01D 2253/1122* (2013.01); *B01J 2220/58* (2013.01)

(58) Field of Classification Search
CPC ..... B01D 53/04; B01D 53/0446; B01D 53/06
See application file for complete search history.

(56) References Cited

U.S. PATENT DOCUMENTS

| | | | | |
|---|---|---|---|---|
| 4,687,650 | A  * | 8/1987 | Goodell | C01B 3/0031 |
| | | | | 423/248 |
| 6,436,352 | B1 * | 8/2002 | Succi | B01D 53/04 |
| | | | | 422/171 |
| 7,115,159 | B2 * | 10/2006 | Fujita | C01B 3/0005 |
| | | | | 165/138 |
| 8,529,673 | B2 | 9/2013 | Chuntonov | |
| 8,623,302 | B2 | 1/2014 | Chuntonov | |
| 8,628,609 | B2 * | 1/2014 | Ornath | B82Y 30/00 |
| | | | | 206/0.7 |
| 2010/0121126 | A1 * | 5/2010 | Northrop | C10G 70/046 |
| | | | | 585/821 |
| 2010/0242727 | A1 * | 9/2010 | Chuntonov | B01D 53/38 |
| | | | | 95/90 |
| 2011/0217491 | A1 * | 9/2011 | Chuntonov | B81B 7/0038 |
| | | | | 428/34.1 |

(Continued)

FOREIGN PATENT DOCUMENTS

IL WO 2012081004 A1 * 6/2012 ............. B01D 53/02

OTHER PUBLICATIONS

GateKeeper® Inert Gas Purifiers by Entegris; 2007-2013; 4 pages.
(Continued)

*Primary Examiner* — Christopher P Jones
(74) *Attorney, Agent, or Firm* — Jianq Chyun IP Office (57) ABSTRACT

Gas purifiers for removal of active and low activity contaminants from gas streams with the help of metal powder sorbent on the basis of binary, ternary and multicomponent alloys. The total mole fraction x of reactive metals like Li, Ca, Sr, Ba and others is in the range of $0.5 \leq x \leq 1.0$.

10 Claims, 8 Drawing Sheets

(56) References Cited

U.S. PATENT DOCUMENTS

2013/0294988 A1    11/2013    Chuntonov

OTHER PUBLICATIONS

Gaskleen® II Purifier by Pall; Data Sheet; Jun. 2011; 3 pages.
Eliminator® by NuPure Corporation; Oct. 15, 2002; pp. 1-2.
K.A. Chuntonov, S.P. Yatsenko; "Getter Films for Small Vacuum Chamber"; Recent Patents on Materials Science; vol. 6; 2013; pp. 29-39.
K.A Chuntonov, M.K. Lee; "Mechanochemical Sorption Apparatuses"; Advanced Materials Research; Trans Tech Publications; Switzerland; vols. 875-877; Feb. 2014; pp. 1106-1110.
K.A. Chuntonov et al.; "The Cx-In Phase Diagram"; J. Less-Common Metals; vol. 83; 1982; pp. 143-153.
A. W. Adamson; Physical Chemistry of Surfaces; John Wiley & Sons; New York; 1982; 16 pages; pp. 601, 613, 614 and 641.

\* cited by examiner

ACTIVATIONLESS GAS PURIFIERS WITH HIGH SORPTION CAPACITY

I. FIELD OF THE INVENTION

The given invention refers to the field of systems for sorption purification of stream gases, in particular, to gas purifiers with the reagent in a form of metal particles consisting of an alloy with high concentration of Li, Ca, Ba, Sr and similar metals.

II. BACKGROUND OF THE INVENTION

In gas purification flow systems of small capacity, which are intended for capturing oxygen, moisture, carbon monoxide and some other contaminants, gas purifiers of in-line or cartridge type are usually used. These gas purifiers consist of an impermeable to gas housing, ports for connecting to a gas line, filters, and a sorption agent. Devices like Gate-Keeper® Inert Gas Purifiers by Entegris, Gaskleen® II Purifier by Pall, Eliminator by NuPure Corporation, etc. can serve as an example.

All these gas purifiers belong to the products of one and the same class with similar and established technical characteristics, among which one of the most important is the specific sorption capacity of the device, which is determined by the specific sorption capacity of the sorption agent. The life span of the device, its dimensions and the general price indices of the purification process depend on the specific sorption capacity of the sorption agent.

At ambient temperature the specific sorption capacity of the currently used gas sorbents, which are porous bodies on the basis of transition metals and/or zeolites, is not large and cannot be sufficiently increased. The progress here is possible only due to new in principle solutions, one of which is described below.

III. SUMMARY OF THE INVENTION

The present invention contains three novelties. The first novelty comes down to replacement of currently used gas sorbents, which have a porous structure, with the rough powders produced by milling reactive ingots. By reactivity we understand here a special sorption mechanism [K. A. Chuntonov, S. P. Yatsenko. Getter Films for Small Vacuum Chambers. Recent patents on Materials Science, Vol. 6, 2013, pp. 29-39], according to which the interaction of the solid particle with gases takes place at room temperature by continuous growth of products on the sorbing surface according a linear or close to linear law.

Reactive metals or alloys reach the theoretical limit of the sorption capacity under usual conditions without any stimulating actions even in the case of powders with the typical size of particles of about 1 mm. Alkali and alkali-earth metals can serve as an example of gas sorbents of this class.

The second novelty refers to the design of the device. Although in some gas purifiers special filling ports are used, they are not adjusted for working with chemically active materials. In our case the housing of the new gas purifier is equipped with a special long filling tube, which is connected to the source of reactive particles for their transfer inside the device under vacuum. After filling is finished the tube is cut close to the housing by sealing it hermetically along the cut with the help of welding under complete isolation of the sorption material from the outside atmosphere.

The third novelty is connected with the source of the reactive particles. In the present invention special mechanical units serve as such sources. The units consist of two departments, one of which can be a recently developed mechanochemical apparatus [K. Chuntonov, Sorption apparatus for the production of pure gases US Patent Application 20130294988, Nov. 7, 2013; K. Chuntonov, M. K. Lee, Mechanochemical Sorption Apparatuses. Advanced Materials Research, Trans Tech Publications, Switzerland, Vols. 875-877, 2014, Pages 1106-1110] and the second one is an intermediate module, which maintains the connection between the apparatus and the gas purifier. The task of the first one is the production of the powder from the initial reactive ingot and the task of the second one is to provide the transportation of the produced particles to the gas purifier in vacuum conditions.

Taken together these three solutions break the habitual stereotypes in gas purification field. The described here gas purifiers with reactive metal powder decrease the expenses for purification of gases by many times and in unprecedented way increase the life span of the given equipment compared with the current systems. The small size of gas purifiers should also be mentioned: having the size of a laboratory level they near the industrial sorption columns in their efficiency.

V. DESCRIPTION OF THE INVENTION

Gas purifiers with reactive powder are a new class of gas purification equipment. Here rough powders of binary, ternary or multicomponent alloys with high concentration of Ba, Ca, Li, Sr, etc., serve as a sorption agent. At this the preference is given to Ca alloys due to their nontoxicity and availability. Under high concentration here it is understood that the total molar fraction of the mentioned metals in the alloy is higher than 0.5. Alloys of such composition in the interaction with active and low activity gases do not require activation or reactivation and demonstrate extremely high sorption capacity, which exceeds by tens and even hundreds times the capabilities of other gas sorbents.

In the described technology the source of the powder particles is a milling mechanism, e.g. a mechanochemical apparatus with a disintegrator [K. Chuntonov, Sorption apparatus for the production of pure gases US Patent Application 20130294988, Nov. 7, 2013] and an auxiliary filling module. The disintegrator, which is equipped with an actuator and a controller, produces a dosed amount of powder by mechanical milling of a reactive ingot in high vacuum. As far as the powder appears it pours through the filling module and the filling tube into the gas purifier and fills its volume. The function of the module is to connect the mechanochemical apparatus with the gas purifier in such a way that would exclude the access of the air to the active material at the stage of its transfer and cutting of the filling tube.

So, mechanochemical apparatuses are used in the present invention not as sorption columns working on fresh powder but as mini factories of reactive powders for gas purifiers. It should be also mentioned that any of the known gas purifiers can be filled with reactive metal gas sorbent if its housing is equipped with a filling tube. The tube should be long enough to be connected through the filling module to the source of particles and later be cut near the housing of the gas purifier and sealed without a seal failure of the device.

Figure 1:
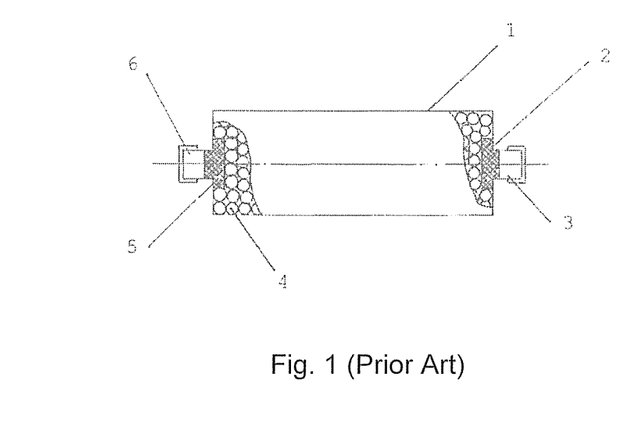
FIG. 1. In-line gas purifier (Prior Art).
Figure 2:
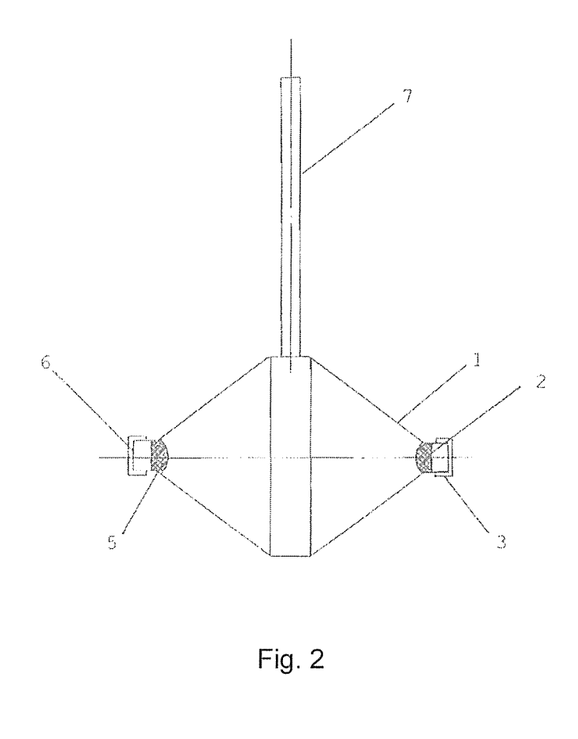
FIG. 2. A new gas purifier with a filling tube.

FIG. 1 schematically shows a typical in-line gas purifier before it is connected to the gas line: a cylindrical vessel 1 with two closed end ports 3 and 6 for gas inlet/outlet, filters 2 and 5, and gas sorbent 4, for which usually zeolites and/or sintered getter materials are used. A new variant of the device is given in FIG. 2. Here 1 is housing, 3 and 6 are closed ends, 2 and 5 are filters, and 7 is a filling tube. The device is shown in the state before being connected to the source of reactive particles.

Figure 3:
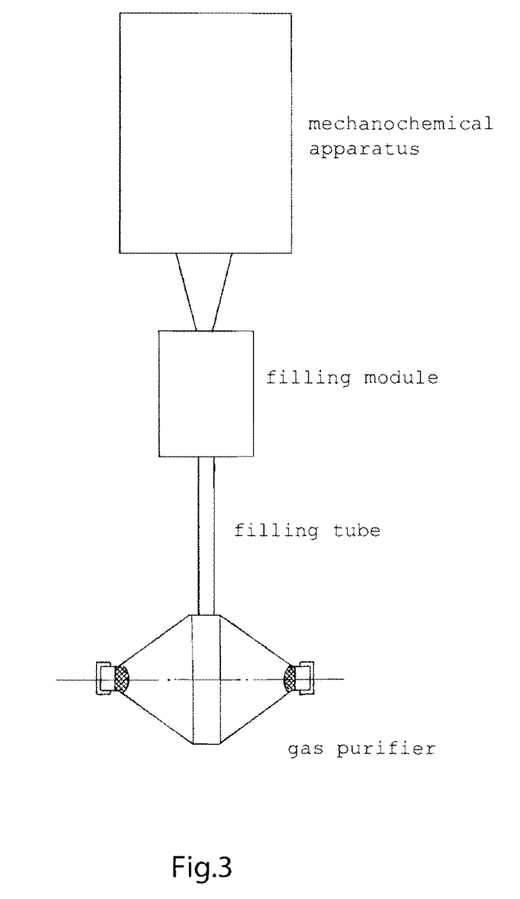
FIG. 3. The arrangement of the participants of the filling process.
Figure 4:
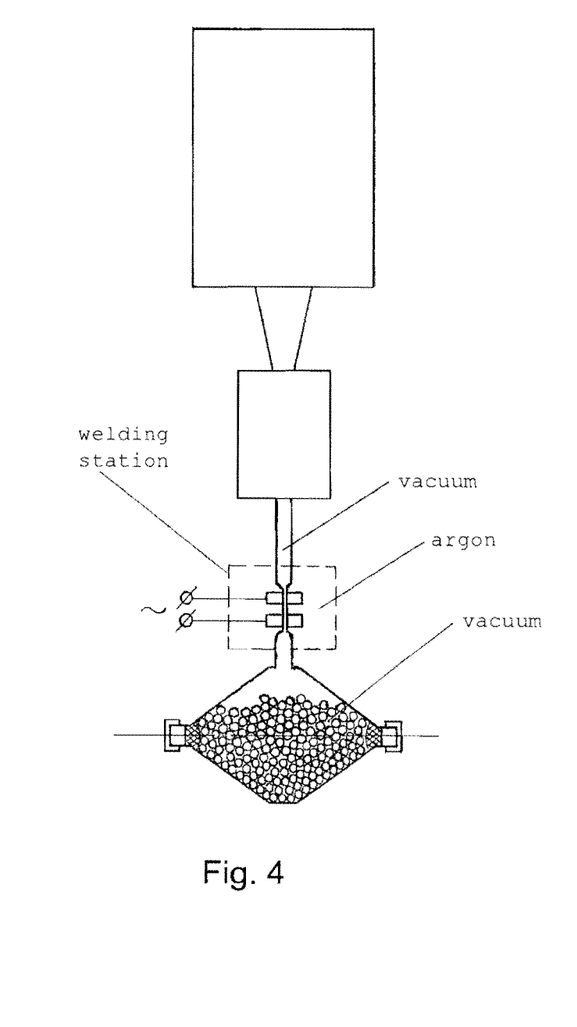
FIG. 4. The finishing stage of the filling process.

FIG. 3 answers the stage of filling, when the gas purifier is connected to the mechanochemical apparatus and the powder particles enter through the filling module and the tube into the device. After filling the gas purifier with powder the tube is tightly covered with a protective cover of the welding station (FIG. 4) front outside, the part of the tube close to the housing of the device is flattened, electrodes are fixed on this part, argon is fed inside the cover and the tube is cut off in the regime of short circuit while vacuum is maintained inside the tube. As a result two hermetically tight seams are formed on each side of the cut [K. A. Chuntonov et al., J. Less-Common Metals, Vol. 83, 1982, pp. 143-153].

Figure 5:
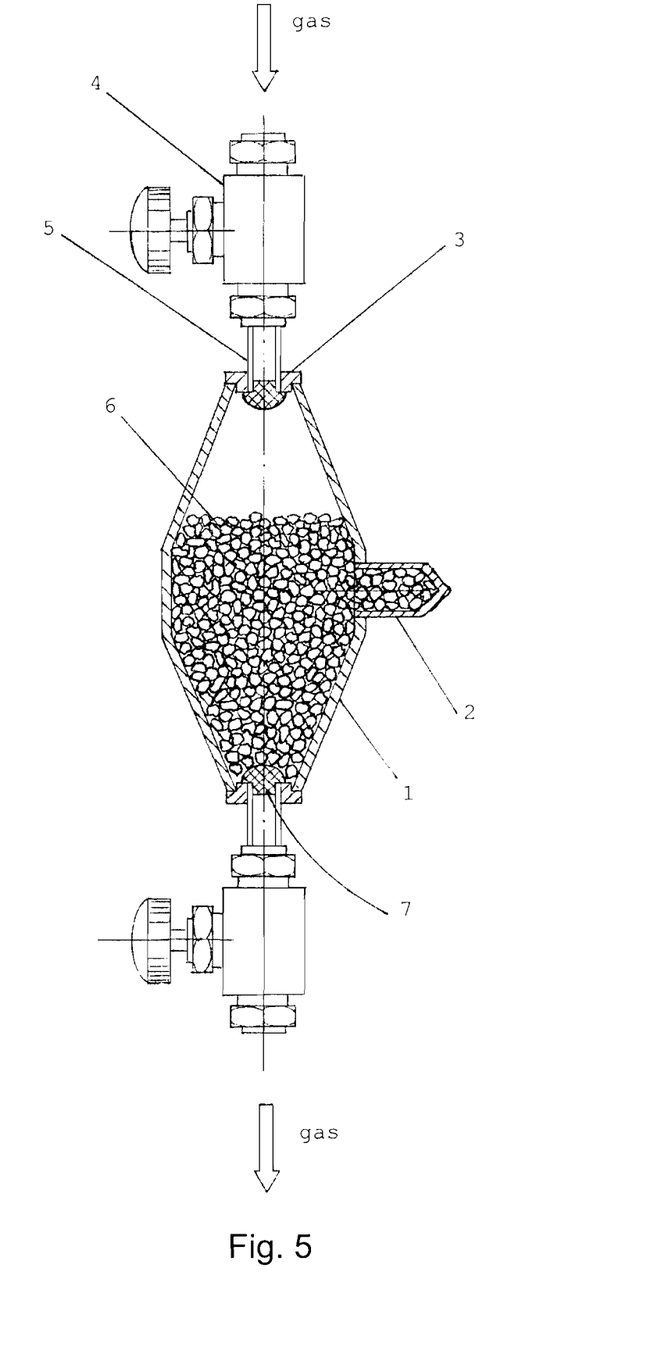
FIG. 5. The design of the new gas purifier (all-metal embodiment).

The final form of the product in its preferred embodiment is shown in FIG. 5, where 1 is all-metal housing with the remains of the filling tube (appendix 2 with the flattened and sealed end) and end caps 3, which are welded to gas pipes 5. Further in this figure: 4 is a gas valve, 6 are metal reactive particles with the linear size from a few hundreds of microns to ~1 mm, 7 is a metal filter in a form of a sintered porous plug.

The geometric shape of the housing is formed by putting two cones together on one common cone basis, which forms a divergent/convergent flow without dead zones, and freely pouring of relatively large powder particles minimize pressure drop. According to the technological capabilities of mechanochemical apparatuses the powders can be of three sorts: purely metal powders, powders with metal core and oxide surface layer, and completely oxide powders.

Using sorption selectivity of reactive metals it is easy to find the necessary alloys for the effective purification of many gases. Let us mention as an example Laves phases of the composition Ca $(Li_xMg_{1-x})_2$, where $\kappa \leq x \leq 1$: at $x=0$ we get a material for nitrogen purification, at $x=1$ we get a material for hydrogen purification, and if $0<x<1$, then we get an alloy for purification of noble gases like Ar, He, Xe, etc. A particular case of the latter can be an alloy of $Ca_{0.33}Li_{0.40}Mg_{0.27}$ and close to it, which can be enhanced if necessary by small additions of barium.

An important role in new gas purifiers is assigned to two gas valves 4 (FIG. 5) on the ends of the device. Sealing of the appendix 2 is done, as mentioned above, in the conditions of vacuum inside the tube and argon atmosphere outside the tube. So after the sealing of the appendix it is necessary to fill the device with inert or process gas. Due to gas valves this procedure becomes a routine procedure; it is described below (FIG. 8) in connection with the task of building a gas purifier into a technological gas line. This procedure is also used at the final stage of assembling the device, before storage or transportation. These valves impart autonomy to the device allowing changing the working position of the gas purifier in the frames of one gas system as well as at transferring it into another gas system without any losses from the side of the gas sorbent and without leaking of the process gas into the atmosphere.

Although two gas valves on the ends of the device increase its cost this increase is negligible compared with the advantages, which are provided by approximately 50-times increase in specific sorption capacity of the gas sorbent and its cheapness. This cheapness is the result of several factors. First, if prices for metals are related to a volume unit, which is correct in the discussed case, then as it can be seen, both the traditional getter materials like Ti, V, and Zr and zeolites are by several times more expensive than the basic reactive metal, which is, for example, Ca. Second, the process of production of reactive powders consists only of two procedures and these procedures, growth of a textured ingot and its milling, are low cost. In fact, liquidus points of reactive metals fit in the temperature interval from 200 to 600° C. and the obtained ingots are prone to mechanical milling: they are brittle and easily destroyable. Third, after the gas sorbent is exhausted, it can be easily recycled; and the housing of the device is restored to the initial shape by removing the deformed part of the appendix and welding the filling tube to the required length. This means, the housing of the device can be used many times.

Figure 6:
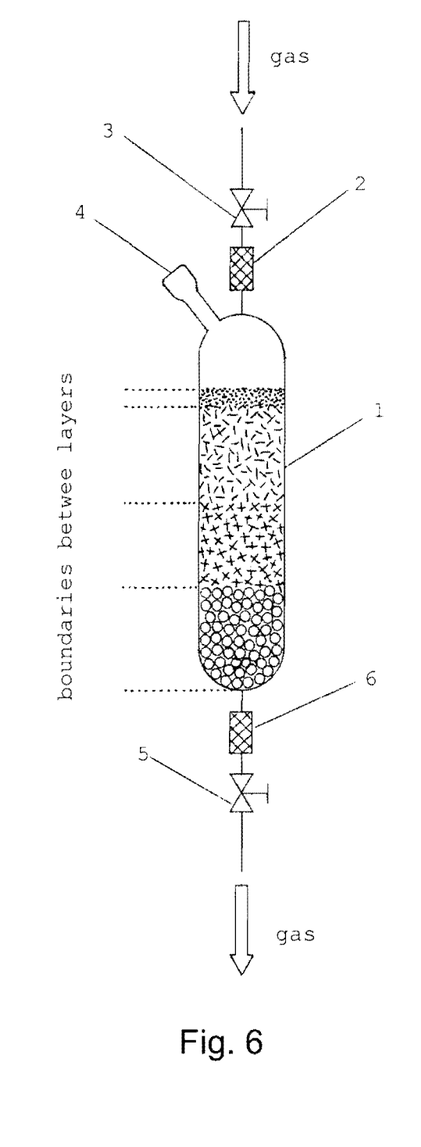
FIG. 6. The second modification of the gas purifier.

One more modification of the new gas purifier is given in FIG. 6, where 1 is an impermeable to gas housing, 2 and 6 are filters for retention of solid particles, 3 and 5 are gas valves in the ends. As well as the described before device (FIG. 5) this one is also intended for high pressure lines; however, it is larger and in the design respect resembles a sampling cylinder. A filling tube 4 (FIG. 6) is located in the end part of the cylinder 1 and this allows filling the layers of the sorbent layer by layer with the layers of different composition e.g., an oxide layer above, then a layer with metal $Me_1$, then a layer with metal $Me_2$, etc. Stratification of this kind is useful when reactions leading to the formation of undesirable gaseous products are possible. If necessary free space above the upper sorbing layer can be filled with plastic hollow spheres of compatible with gases material.

For low pressure gas lines not only stainless steels as in the above mentioned solutions are suitable as a construction material for new gas purifiers but other materials as well, including glass, transparent polymers, etc., which at room temperature are stable to solid reactive particles containing alkali or alkali-earth metals. Such substitution of the housing material easies the production of gas purifiers and makes it cheaper opening new application fields for the new gas purifiers, e.g. in research, for analytical purposes, in education, etc.

Let us also mention that the shown in FIGS. 5 and 6 gas purifiers can be filled with granules of sorbents on the basis of solid solutions of Li [Chuntonov K. Safe gas sorbents with high sorption capacity on the basis of lithium alloys. U.S. Pat. No. 8,529,673, Sep. 10, 2013] or intermetallic compounds of Ba [Chuntonov K. Barium containing granules for sorption applications. U.S. Pat. No. 8,623,302, Jan. 7, 2014].

Figure 7:
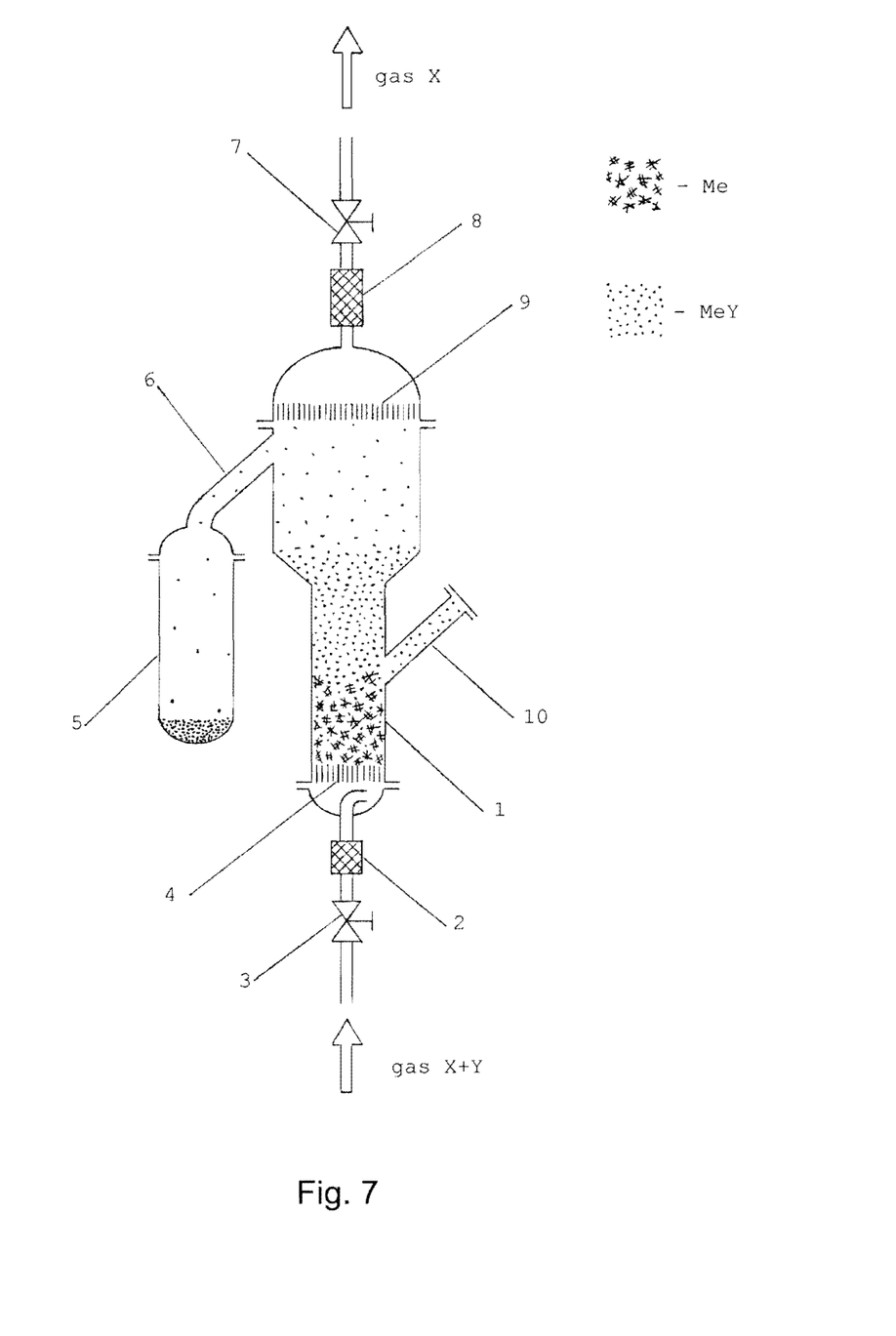
FIG. 7. The third modification of the gas purifier.

Finally, one more type of gas purifiers with reactive powder is shown in FIG. 7. This is a sorption column 1 with maximally high efficiency, which is achieved due to the employment of fluidized bed technology. Opposite to the described above examples here the inlet of the gas to be purified is performed not from above but from below upwards through valve 3 and filter 2.

In the regime of fluidized bed (FIG. 7) under the influence of upward stream of X+Y, where X is the main gas and Y is gas impurity, reactive particles Me, which were earlier resting on the distributor plate 4, come into chaotic motion and colliding with each other get rid of the layer of products MeY, which is formed on their surface. Due to the continuous renewal of their surface the particles react with gases under the conditions, when $0<\theta<1$, where $\theta$—coverage (about $\theta$ see for example, [A. W. Adamson. Physical Chemistry of Surfaces, John Wiley & Sons, New York, 1982]). So in such process the sorption rate is determined by the reaction Me+Y=MeY, which is by many times faster than it would be in the case of motionless particles, when the kinetics of the process is limited by the diffusion of the reagents through the growing layer of product MeY. Small particles of MeY appearing as the result of chemical reactions and mechanical hitting in fluidized zone are carried upwards by the gas flow, where the mixture MeY+X is separated: molecules of gas X passing through exhaust filter 9, outside filter 8 and valve 7 leave the gas purifier and particles of MeY are removed via discharge port 6 into receiver of solid waste 5.

This design of a gas purifier sufficiently improves its operational characteristics. While gas purifiers of the first two models (FIGS. 5 and 6) are replaced with the new ones after their sorption resource is exhausted and the purifiers are returned to the manufacturer for refilling, gas purifiers of the third type (FIG. 7) are periodically fed with the fresh sorbent in their working position through the filling port 10. As far as the receiver is filled with MeY, the latter is also periodically removed. For removing of MeY as well as for feeding the column through the filling port inert gas is introduced into the system temporally instead of gas X+Y.

The last model of gas purifiers raises an issue about the degree of generality of the discussed here gas purifiers with reactive sorbent. Strictly speaking the last model should not have been included in the group of activationless devices as in the fluidized bed regime activation of sorbent particles due to the energy of gas flow takes place. However, there are three reasons for leaving everything as it is.

First, all the three models of the new gas purifiers are united by the same sorbing material—mechanically grinded alloys of reactive metals. This is the dominating factor.

Second, in getter technologies under activation intensification of the sorption processes with the aid of heating is usually understood, i.e. thermal activation. In the new gas purifiers there is no such activation.

Third, fluidization of reactive particles is only one of the ways of performing the sorption process while the design of the sorption column shown in FIG. 7 allows performing gas purification in other regimes as well, e.g. with motionless particles in the case of gas inlet from above downwards or in the case of gas inlet from below upwards but with the rates lower than the incipient fluidization point, when sorption runs in a similar way in all the three models.

So at the moment, at the starting stage of the development of the new technology it is more convenient to consider all its modifications as belonging to one general class of sorption apparatuses using metal reactive powders as getter material.

In order to build a gas purifier with reactive powder into an operating technological line it is possible to follow the established rules according to which a gas purifier is connected to the purification system under a certain excess pressure of the gas, which is released into the atmosphere. During this procedure a gas valve on the end of the gas purifier remains closed fill the complete hermiticity of the connection is reached.

Figure 8:
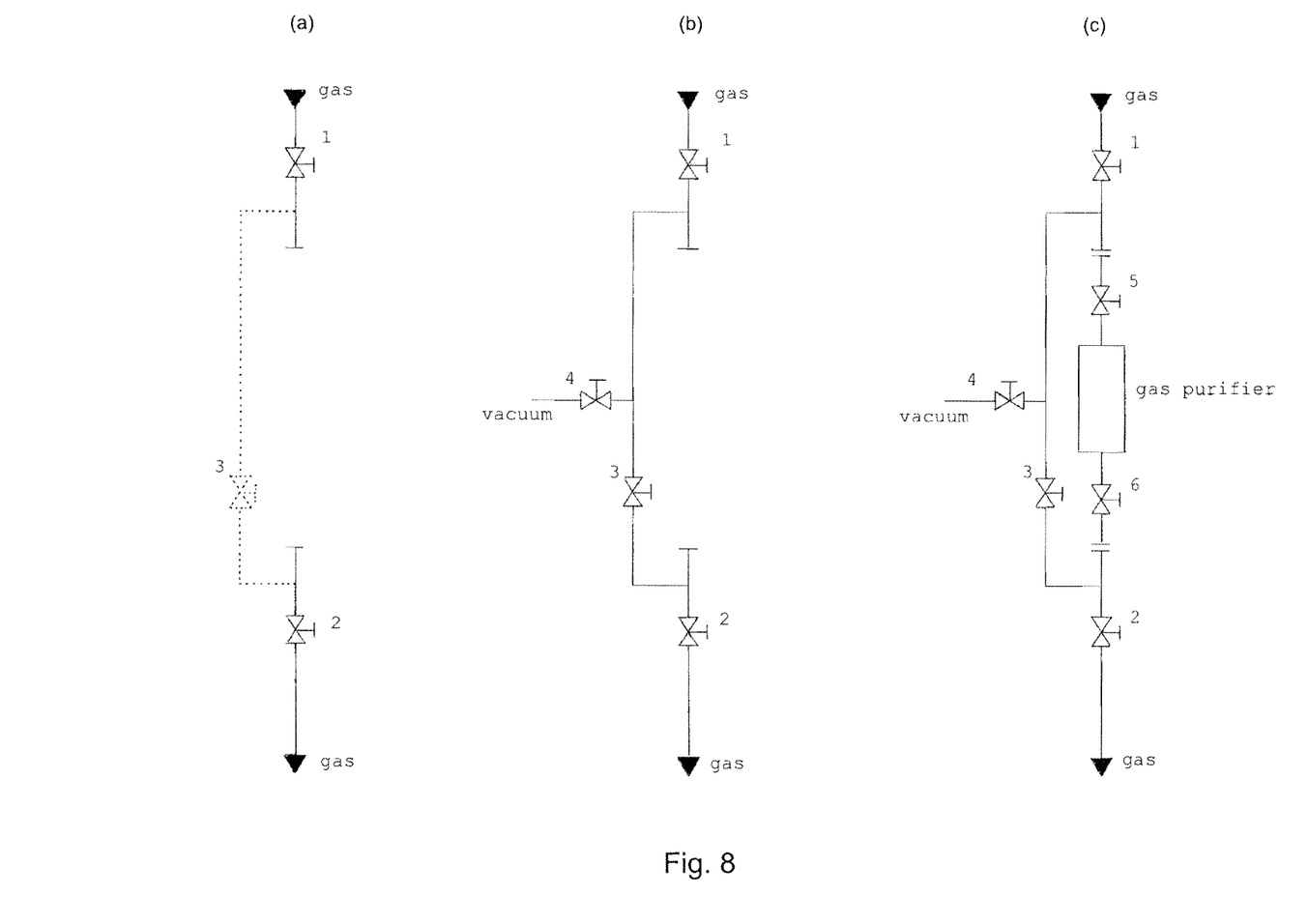
FIG. 8. A scheme of installation of gas purifiers into a gas purification system.

Another installation method, which is more convenient and prevents the inside gases from getting into the atmosphere, is shown in FIG. 8. Here (a) answers the previous method using purge gas flow, while (b) presents a new solution, which allows using the advantages of vacuum. Position (c) helps to explain how the gas purifier is included into the operating gas purification system. In the beginning at closed valves 1-6 all ports from the side of the gas line and the gas purifier are tightly connected, then at closed valves 1, 2, 5 and 6 valves 3 and 4 are opened to pump down the air from the connecting pipes with the help of a sorption pump located in the vacuum line.

After removing of the air from all pipes between the gas line and the gas purifier valve 3 is closed and valve 1 is slightly opened for gas inlet, then valve 4 is closed. Further valve 5 is opened for equalizing the pressure in the system and in the gas purifier. Gas purifier is ready for checking its workability, for which it is necessary to open valves 6 and 2. So, the described installation method completely excludes getting of the inside gases from the technological system into the atmosphere.

Thus, gas purifiers with reactive metal particles of the size from some hundredths of microns to 1 mm are capable of removing active and low activity contaminant gases from a gas stream better than it was before. This should be understood in the sense that the new gas purifiers sufficiently excel its predecessors in such basic criterion as price/quality of the produced product.

Figure 9:
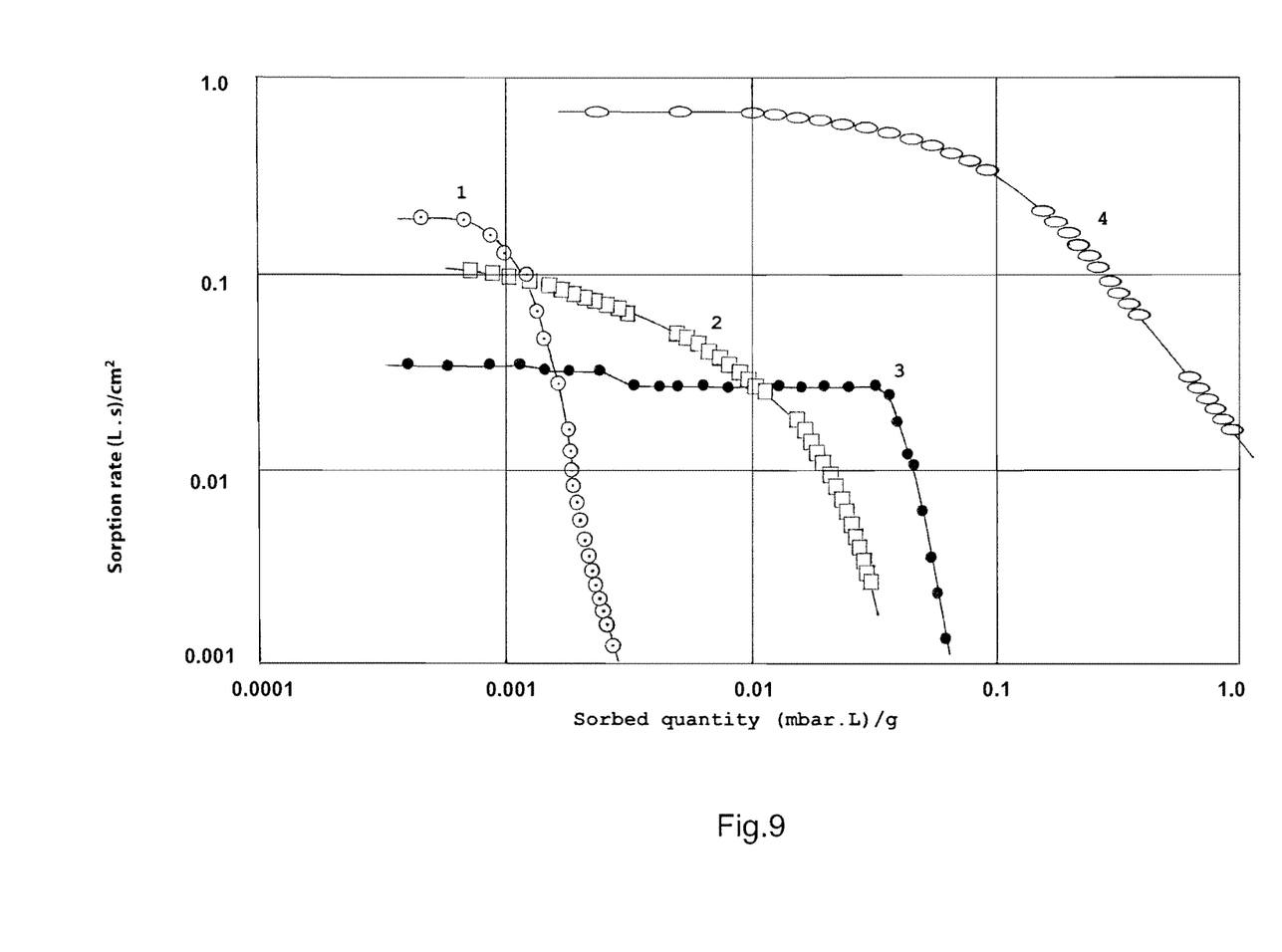
FIG. 9. Sorption tests of $Ba_8Ga_7$ and GaLi powders.

Below FIG. 9 shows test results, made by a dynamic sorption method [Dr. Janez Šetina, IMT, Ljubljana, Slovenia] to define the sorption parameters of powders of $Ba_8Ga_7$ and LiGa and to compare them with the properties of such known high porous getter material as St.122. Nitrogen, which is one of the most difficult for removal gases, was chosen for a test gas.

Sorption curves show (FIG. 9) that the sorption capacity of rough powders of $Ba_8Ga_7$ (curve 2) and LiGa (curve 3) is higher than that of St.122 (curve 1) accordingly by 15 and 30 times. Powders of $Ba_8Ga_7$ were exposed under vacuum in sealed-off ampoules for two weeks before the measurements; powders of LiGa were prepared by breaking small crystals in high vacuum directly before the measurements. It is obvious that if in the mentioned intermetallic compounds gallium is replaced by a reactive metal in accordance with the ideas of the present invention, the sorption capacity of the reactive powder will increase approximately by two ore.

Finally, curve 4 (FIG. 9) on the example of oxygen (the sorbent is $Ba_8Ga_7$ powder) confirm the ability of reactive metal powders to capture large amounts of active gases, which is the main task of the new gas sorbents—to completely remove oxygen and moisture from gas streams at room temperature with minimum consumption of the sorption material.

VI. SHORT RESUME

1. New gas purifiers with a metal reactive agent in a form of rough powder excel in its sorption capacity all the current gas purifiers by one-two orders of magnitude with all the ensuing consequences: a corresponding increase of the life span and/or decrease of the dimensions of the device.

2. High sorption capacity of the new devices is the consequence of a special sorption mechanism of those metals, which are used in the given case as gas sorbents; first of all, these are Ca, as well as Ba, Li and others: their interaction with active and low activity gases at room temperature tales place by continuous growth of products on the sorbing surface.

3. The sorption process runs according to the mentioned mechanism under the condition that mole fraction x of the reactive metal in the sorption material is not less than 0.5. For this reason in the present invention for purification of gas streams binary, ternary and multicomponent alloys with the total mole fraction of reactive metals in the range of $0.5 \leq x \leq 1.0$ are employed.

4. Replacement of the current gas sorbents with reactive metals powders required new design solutions covering all stages of gas purifiers production: production of powders, their transfer inside the gas purifiers and, finally, hermetization of the housing of the device.

5. For the production of reactive particles a mechanochemical sorption apparatus, which allows milling reactive alloys in high vacuum in a controlled way, was adjusted. This is a new application for mechanochemical apparatuses—to produce reactive powders, which are further reloaded into target reactors, e.g. sorption columns or gas purifiers, which are working at ambient temperatures.

6. Transfer of the powder from the apparatus to a gas purifier is performed with the help of an auxiliary module, which connects the apparatus with the filling tube of the gas purifier. Taken together the apparatus and the module form an integral unit—a mechanical unit intended for filling gas purifiers with consumable reactive sorbent.

7. An optimal solution for the problem of hermetization of gas purifier ports has been found: when the filling tube is cut-off from the source of powder particles, it is sealed by a welded seam automatically without vacuum failure inside the device; and the gas ends of the device inlet/outlet are equipped with two gas valves due to which the operation of the gas purifier becomes easy and safe.

8. One more advantage of reactive powders is their high economic efficiency: calculated per volume unit their cost is much cheaper than that of the current gas sorbents, zeolites and traditional getter materials. This has a simple explanation: Ca, Li, and Mg, which form in the quantitative respect the basis of the new gas sorbent, belong to widely spread in the Earth crust metals with relatively low melting temperatures. Besides, the technology of preparation of the reactive powders comes done to only two procedures, ingot melting and its mechanical milling. As to milling, the above mentioned concentration condition $0.5 \leq x \leq 1.0$ not only sets the desired sorption mechanism but also provides favorable for milling mechanical properties of the alloys, their brittleness and fragility.

9. Additional intensification of the sorption process in new gas purifiers is achieved in their special modification adjusted to fluidized bed technology. This model allows replacing of the exhausted sorbent by a fresh one directly at the working place of the gas purifier in the gas purification system.

10. Thus, taking into consideration high sorption efficiency of the reactive metal powders, their low cost, and the fact that the housing of the gas purifier refers to multiple or long time use products we come to the conclusion that gas purifiers with a reactive metal agent are gas purification equipment of a new class with considerably improved technical parameters and sufficiently less expenses for the gas purification process than the current products.

The invention claimed is:

1. A gas purifier for a removal of active and low activity contaminants from gas streams, comprising a sorbent agent which is powders of reactive alloys, the powders capture gas contaminants by a continuous growth of products on sorbing surfaces of the powders, and also comprising a housing filled with the powders, and a flattened-and-cut filling tube configured as a hermetical seam at the housing of the gas purifier.

2. The gas purifier according to claim 1, where the housing of the gas purifier is an all-metal housing and contains two gas ports including an inlet port and an outlet port and each of the two gas ports equipped with a gas valve and a filter, and a prolonged filling tube for transporting of the powders inside the all-metal housing under conditions of isolation from an outside atmosphere.

3. The gas purifier according to claim 1, where the housing of the gas purifier is a sorption column of periodical action with two gas ports including an inlet port and an outlet port and each of the two gas ports equipped with a gas valve and a filter, a filling port for feeding the column with a fresh sorbent, a discharge port for collecting of a solid waste and a distributor plate.

4. The gas purifier according to claim 1, where the housing of the gas purifier is made of a glass or of a transparent polymer material and has two gas ports including an inlet port and an outlet port and each of the two gas ports equipped with a gas valve and a filter, and a prolonged filling tube for transporting of the powders.

5. The gas purifier according to claim 1, where the reactive alloys contains alkali and/or alkali-earth metals, comprising at least one type of metals of Li, Ca, Mg, Ba, and Sr in the range of $0.5 \leq x \leq 1.0$, where x is a total mole fraction of the alkali and/or alkali-earth metals in the reactive alloys.

6. The gas purifier according to claim 2, where for filling the all-metal housing with the powders, the filling tube is connected to a milling machine, which mechanically mills an ingot of the reactive alloys in a high vacuum into the powders and pours the powders into the housing.

7. The gas purifier according to claim 6, where a mechanochemical sorption apparatus with a disintegrator serves as the milling machine for a production of a pre-set amount of the powders of the reactive alloys under conditions of a high vacuum.

8. The gas purifier according to claim 6, where after the housing is filled with the powders, the gas purifier and the milling machine are disconnected units, and the flattened-and-cut filling tube is configured as the hermetical seam at the housing of the gas purifier by flattening and cutting of the filling tube.

9. The gas purifier according to claim 8, where the housing with the powders of the reactive alloys for further storage or transportation also contains an inert gas transported therein through an inlet gas valve.

10. The gas purifier according to claim 3, where an intensification of a sorption processes is achieved by using a fluidized bed regime in which the inlet port and the distributor plate are situated in a lower part of the sorption column and the outlet port is situated in an upper part of the column.

* * * * *

UNITED STATES PATENT AND TRADEMARK OFFICE
CERTIFICATE OF CORRECTION

| | | |
|---|---|---|
| PATENT NO. | : 9,586,173 B2 | Page 1 of 1 |
| APPLICATION NO. | : 14/595268 | |
| DATED | : March 7, 2017 | |
| INVENTOR(S) | : Chuntonov Konstantin | |

It is certified that error appears in the above-identified patent and that said Letters Patent is hereby corrected as shown below:

On the Title Page

Item (72) Inventor: Setina JANEZ, Ljubljana (SL) should be changed to -- Setina JANEZ, Ljubljana (SI) --.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*